Dec. 19, 1922.
J. M. KROEKER.
TRACTOR GUIDE.
FILED FEB. 8, 1922.
1,439,558.
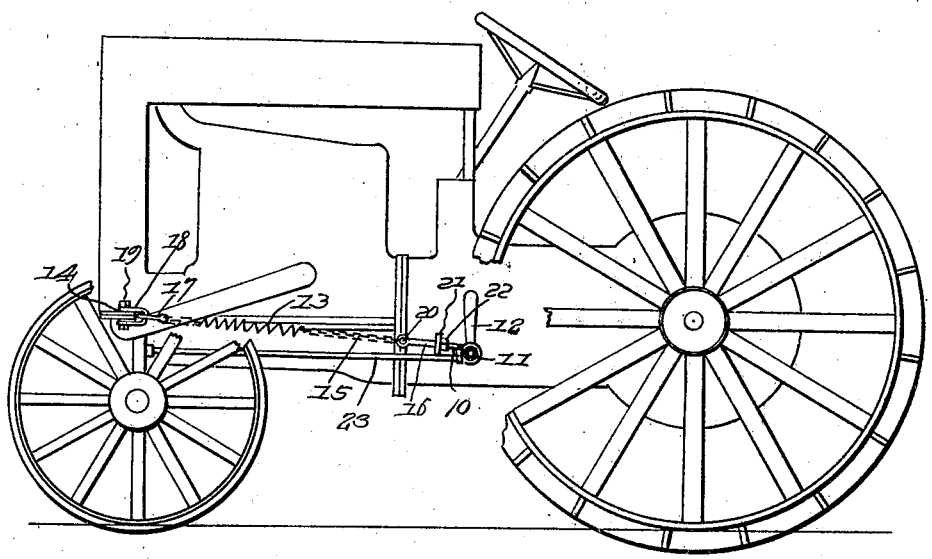
Fig.1.
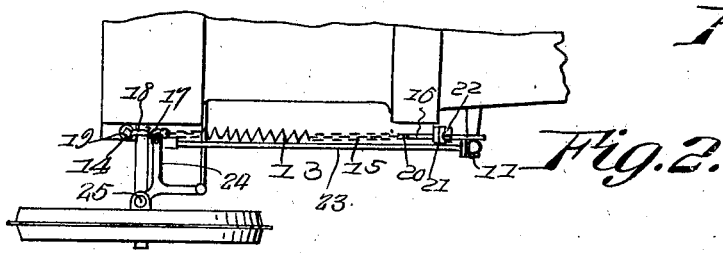
Fig.2.
Fig.3.
Fig.5.
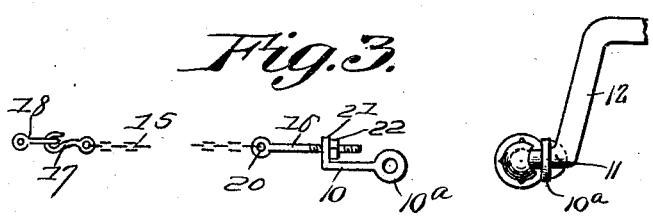
Fig.4.
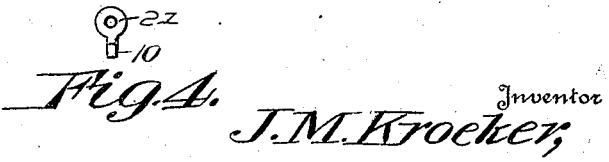
Inventor
J. M. Kroeker,
By
Attorney Patented Dec. 19, 1922.

1,439,553

UNITED STATES PATENT OFFICE.

JACOB M. KROEKER, OF WEATHERFORD, OKLAHOMA.

TRACTOR GUIDE.

Application filed February 8, 1922. Serial No. 534,926.

*To all whom it may concern:*

Be it known that JACOB M. KROEKER, a citizen of the United States of America, residing at Weatherford, in the county of Custer and State of Oklahoma, has invented new and useful Improvements in Tractor Guides, of which the following is a specification.

The object of the invention is to provide simple and efficient means for use in connection with Fordson and other tractors for holding the machine in proper relation to the land side of the furrow in plowing and counteracting the tendency of the machine to diverge from the line of said land side, without relying upon the efforts of the operator of the machine exerted through the steering gear, and hence to avoid the wear and tear upon the steering gear and the effort to which the operator is subjected in maintaining a proper course or path of movement of the tractor; and with this object in view the invention consists in a construction and combination of parts of which a preferred embodiment is shown in the accompanying drawings, wherein:—

Figure 1 is a side view of a tractor provided with a steering or compensating attachment constructed in accordance with the invention.

Figure 2 is a plan view of the same.

Figure 3 is a detail view of the guiding attachment disconnected from the tractor.

Figure 4 is a detail end view of the bracket by which connection is made with the journal pin of the steering arm.

Figure 5 is a detail view of the bracket arm and its related parts shown in operative relation with journal pin of the steering arm.

The device consists essentially of a bracket arm 10 secured in a fixed relation by any suitable means such as the journal pin 11 of the steering arm 12 of the tractor at the side adjacent to the land side or toward which it is desired to produce a resistance, and a spring 13 anchored as at 14 to a fixed part of the tractor in advance of the steering knuckle, such as the forward end of the hood, a flexible connection such as a chain 15 between the spring and the inner end of said steering arm, and means such as a tension bolt 16 connecting the chain with the steering arm and adapted to serve as a take-up for applying effective tension to the spring to resist the tendency of the steering wheels of the tractor to be diverted from a course in parallelism with the land side of the furrow.

In the construction illustrated the spring 13 may be provided at its front end with a hook 17 for engagement with a clevis 18 attached by means of a bolt 19 or its equivalent to a fixed part of the tractor such as the front end of the hood, a radiator bolt being suitable for this purpose as shown. The rear end of the flexible connection consisting in the present instance of the chain 15 is engaged with an eye 20 on the tension bolt 16, said bolt extending through an eye 21 in the front end of the bracket arm 10 and being engaged by a nut 22, so that by the adjustment of the nut any desired tension may be applied to the spring to exactly counterbalance or compensate for the tendency of the wheel of the tractor to leave the land side of the furrow, and hold said wheel in guiding contact with the land side, so that without effort on the part of the operator exerted through the steering gear of the machine or otherwise, the tractor will be guided by the land side of the furrow previously made, and hence will produce furrows in parallel relation without the inconveniences and departures therefrom which are common in the present practice.

In the construction illustrated the bracket arm 10 is provided with an eye $10^a$ which receives the journal pin 11 which in tractors of the Fordson type constitutes the outwardly turned extremity of the steering arm 12 depending at the left side of the tractor and connected by a rod 23 with the arm 24 of the left hand steering knuckle 25.

Having described the invention, what is claimed as new and useful is:—

1. A steering attachment for plowing tractors to hold the front furrow wheel in guiding contact with the land side of the furrow, the same consisting of a bracket arm attachable to the steering arm and a yielding tensioned connection between said bracket arm and a fixed part of the tractor frame, said bracket arm having an eye for engaging the steering arm journal pin.

2. A steering attachment for plowing tractors to hold the front furrow wheel in guiding contact with the land side of the furrow, the same consisting of a bracket arm attachable to the steering arm and a yielding tensioned connection between said bracket arm and a fixed part of the tractor frame, said connection including a spring and a tensioning bolt.

3. A steering attachment for plowing tractors to hold the front furrow wheel in guiding contact with the land side of the furrow, the same consisting of a bracket arm attachable to the steering arm and a yielding tensioned connection between said bracket arm and a fixed part of the tractor frame, the connection having a terminal tensioning bolt adjustably mounted upon said bracket arm.

In testimony whereof he affixes his signature.

JACOB M. KROEKER.